D. T. TIMBERLAKE.
MOTOR TRUCK.
APPLICATION FILED MAR. 8, 1917.
1,294,198.
Patented Feb. 11, 1919.
3 SHEETS—SHEET 1.
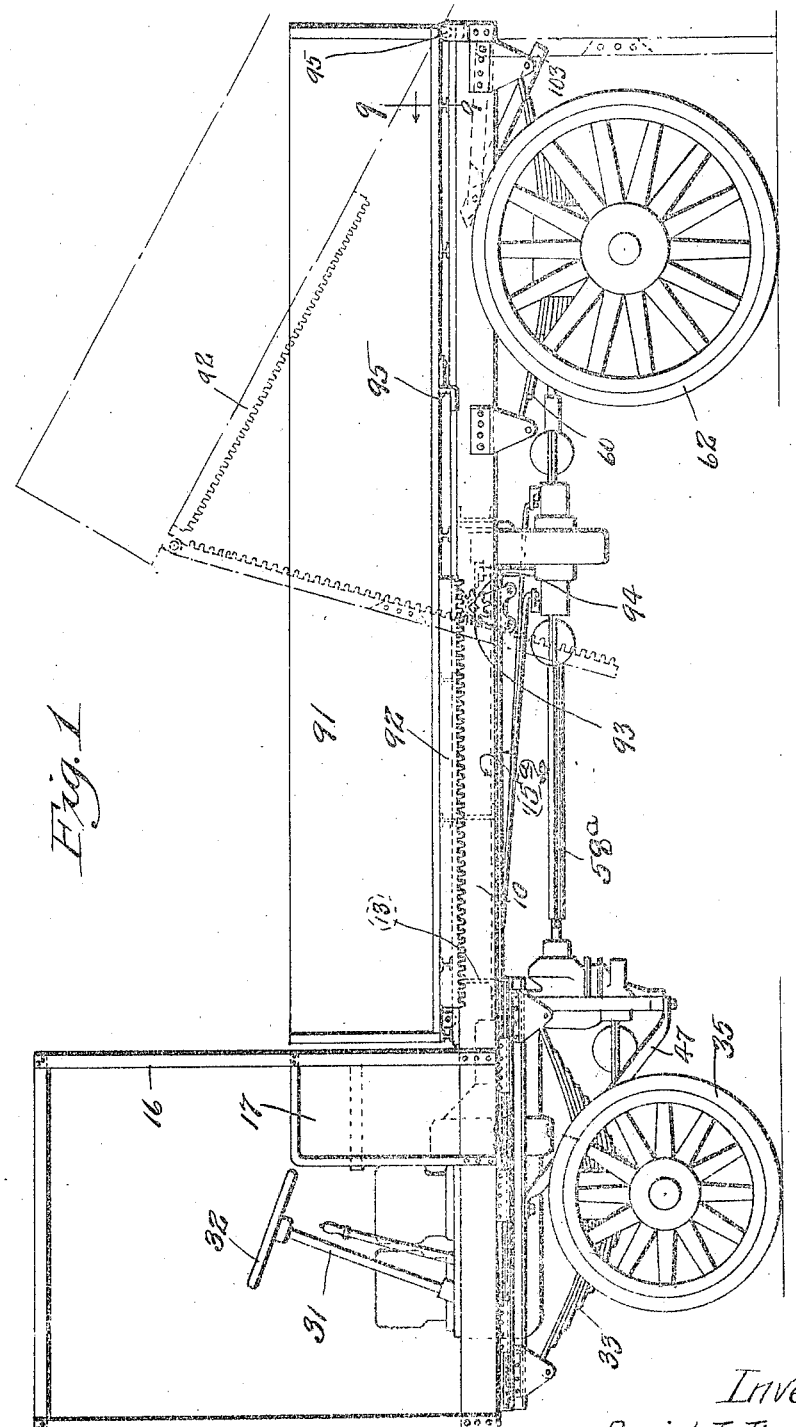
Inventor
Daniel T. Timberlake
By S. R. Cornwell, Atty.

D. T. TIMBERLAKE.
MOTOR TRUCK.
APPLICATION FILED MAR. 8, 1917.
1,294,198.
Patented Feb. 11, 1919.
3 SHEETS—SHEET 2.
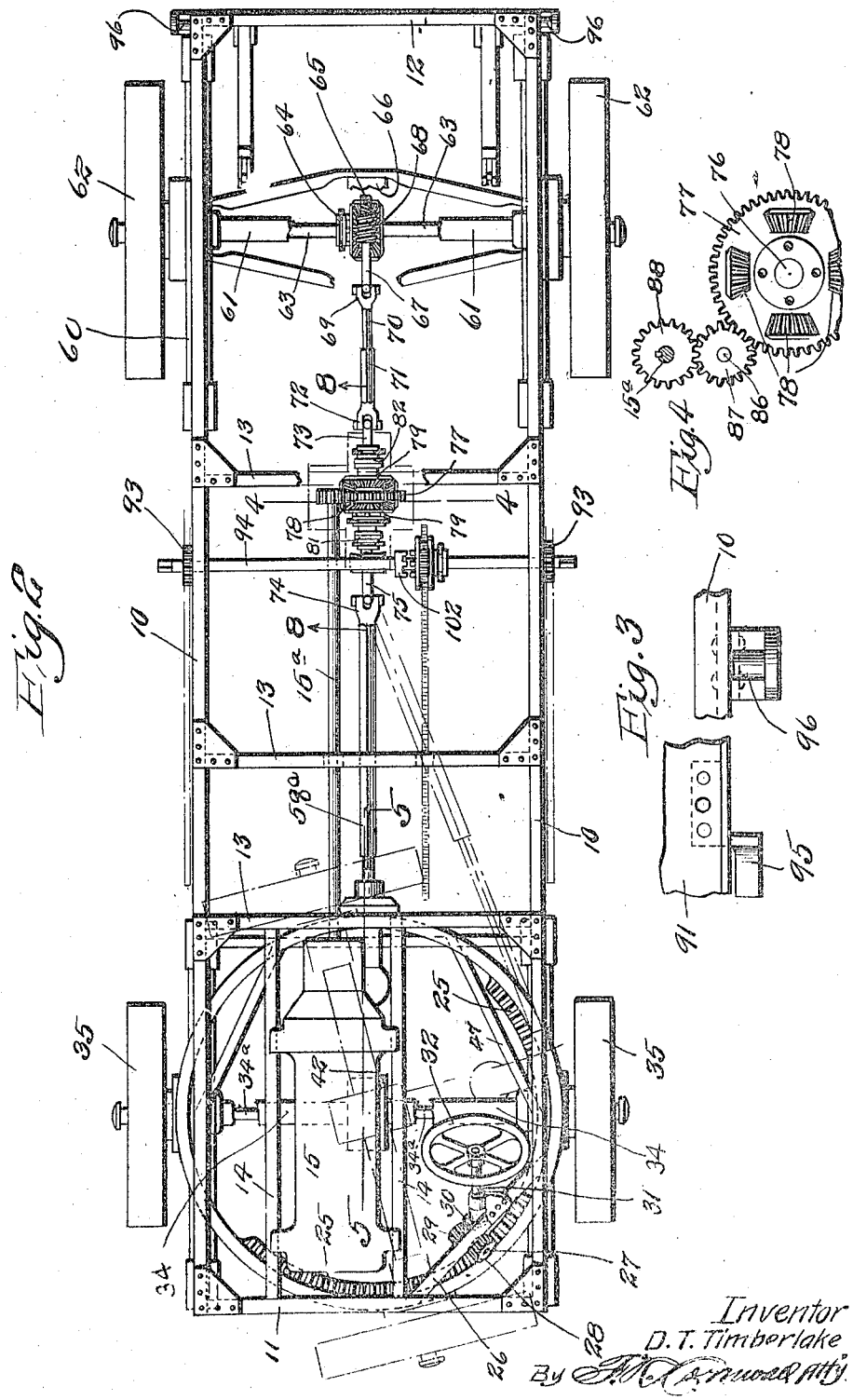
Inventor
D. T. Timberlake

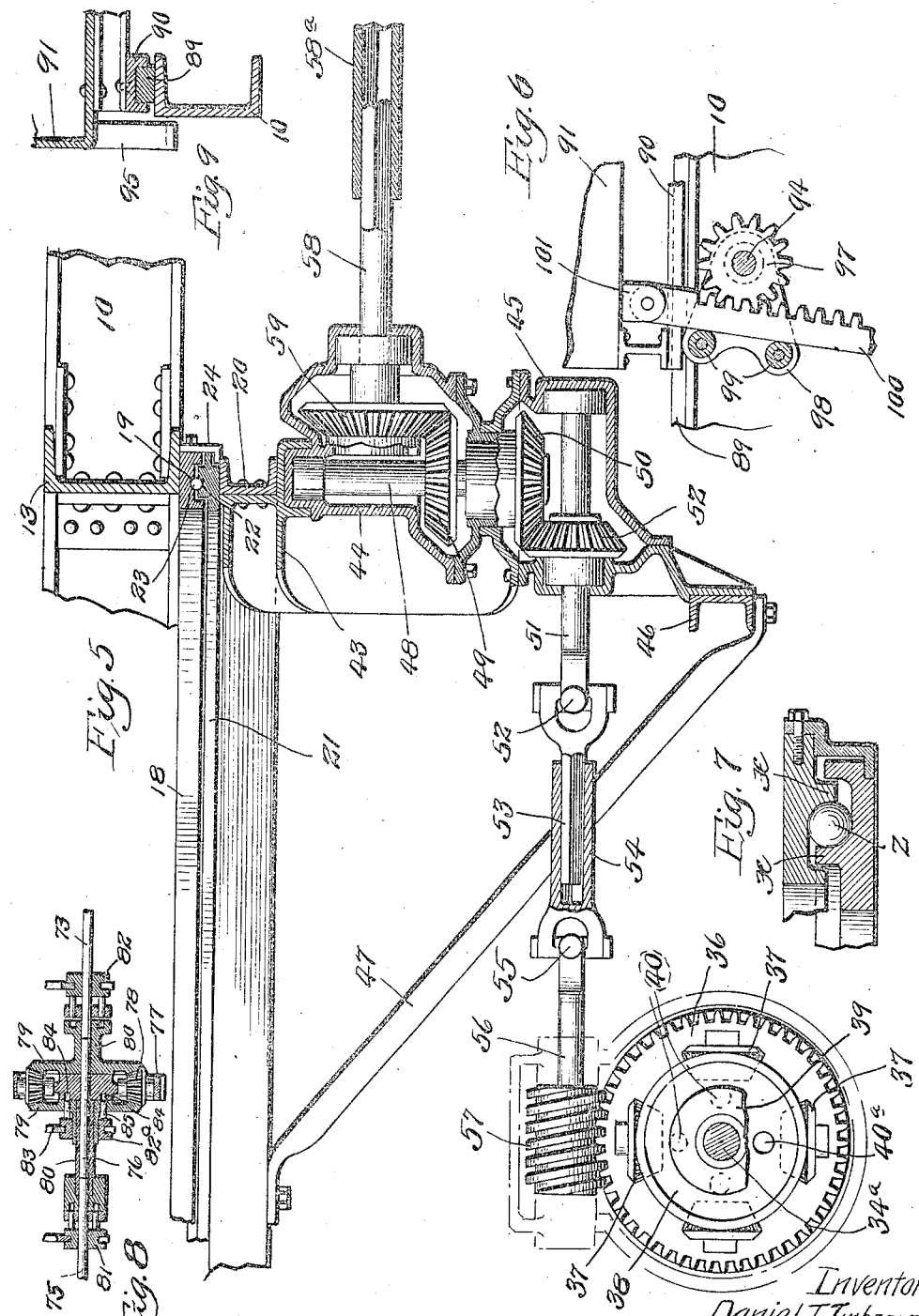

ary 18, 1913.
UNITED STATES PATENT OFFICE.

DANIEL T. TIMBERLAKE, OF ST. LOUIS, MISSOURI, ASSIGNOR TO UNIVERSAL MOTOR TRUCK AND TRACTION ENGINE COMPANY, OF ST. JAMES, MISSOURI, A CORPORATION OF MISSOURI.

MOTOR-TRUCK.

1,294,198.　　　　　Specification of Letters Patent.　　Patented Feb. 11, 1919.

Application filed March 8, 1917. Serial No. 153,307.

*To all whom it may concern:*

Be it known that I, DANIEL T. TIMBERLAKE, a citizen of the United States, residing at St. Louis, Missouri, have invented a certain new and useful Improvement in Motor-Trucks, of which the following is a full, clear, and exact description, such as will enable others skilled in the art to which it appertains to make and use the same, reference being had to the accompanying drawings, forming part of this specification.

My invention relates to a motor truck or engine driven vehicle, the principal objects of my invention being to provide a comparatively simple and effective truck wherein all four wheels are positively driven; to mount the front wheels of the truck upon a frame, the same being mounted to revolve through an arc of approximately one hundred eighty degrees, which arrangement permits the front wheels to be turned into position approximately at right angles to either one of the rear wheels, thus enabling the truck to be turned in either direction within a limited or comparatively narrow space; to provide improved and efficient means for transmitting power from the engine shaft to both front and rear axles and also to means for controlling the power thus transmitted; to provide the truck with a sliding bed or body which is adapted to contain the loads carried by the truck, and further, to provide simple and efficient means for shifting the bed or body into dumping position.

My present invention relates to and is an improvement upon certain details of construction disclosed in United States Letters Patent No. 1,053,329, granted to me February 18, 1913.

With the foregoing and other objects in view, my invention consists in certain novel features of construction and arrangement of parts, hereinafter more fully described and claimed and illustrated in the accompanying drawings, in which—

Figure 1 is a side elevational view of a motor truck of my improved construction;

Fig. 2 is a top plan view of the truck with the bed or body removed and with parts broken away and in section in order to more clearly illustrate certain parts of the operating mechanism;

Fig. 3 is a fragmentary plan view of the means utilized as a stop for limiting the rearward sliding movement of the bed or body of the truck upon the frame thereof;

Fig. 4 is an enlarged cross sectional view taken approximately on the line 4—4 of Fig. 2;

Fig. 5 is an enlarged vertical section taken approximately on the line 5—5 of Fig. 2;

Fig. 6 is a detail view partly in section of a rack and pinion utilized for elevating the forward end of the bed or body when the load is dumped;

Fig. 7 is a detail section of a modified form of bearing between the main truck frame and the revolving frame which carries the front wheels.

Fig. 8 is an enlarged section taken approximately on the line 8—8 of Fig. 2;

Fig. 9 is an enlarged cross section taken approximately on the line 9—9 of Fig. 1.

As illustrated in the accompanying drawings which disclose a practical embodiment of my invention, the main frame of the truck comprises side rails 10, front and rear end rails 11 and 12, and a series of intermediate rails 13. All the members of this frame are preferably formed of commercially rolled shape, such as channels, I-beams, Z-bars, or the like, and their ends are rigidly connected in any suitable manner, preferably by means of brackets or gusset plates.

Longitudinally disposed between the front rail 11 and the adjacent one of the cross beams 13 is a pair of rails 14 which serves as a support for a motor 15, preferably an internal combustion engine. Rising from the forward end of this frame is a skeleton framework 16 which may be inclosed or partially inclosed as desired, and arranged in this framework above and to the rear of the engine 15 is a driver's seat 17.

Fixed in any suitable manner to the underside of the main frame of the truck and extending from one side rail to the other and from the front rail 11 to the adjacent cross rail 13 is a ring 18 in the underside of which is formed a ball race 19. Arranged beneath this ring is a revolving frame 20, preferably made up of commercially rolled members, and which frame carries the front axle, front wheels, and associated parts.

Fixed in any suitable manner on top of this frame 20 is a ring 21 in the top of which is formed a ball race 22, the latter being disposed directly beneath the race 19 and positioned in said races is a series of balls 23. The revolving ring 21 is held in operative position beneath ring 18 by means of a series of substantially L-shaped keepers 24, the same being secured to ring 18 and their lower ends engaging beneath an outwardly presented flange which projects from ring 21. (See Fig. 5.)

Formed integral with or fixed to the inside of ring 21 and extending through an arc of approximately one hundred eighty degrees is a toothed rack 25. Journaled in a suitable bearing on the underside of a brace 26 is a short shaft 27, one end of which carries a pinion 28, the same meshing with the teeth of rack 25 and the opposite end of said shaft carrying a worm wheel 29. Engaging the teeth of this worm wheel 29 is a worm 30, the same being carried on the lower end of a steering shaft 31, the upper end thereof being provided with a steering wheel 32 which is positioned in front of the driver's seat 17.

The ends of semi-elliptic leaf springs 33 are secured to the underside of frame 20 at the sides thereof, and secured to and positioned beneath the central portions of said springs are suitable bearings for the tubular front axle 34, the latter being formed in two parts and each part carrying on its outer end a traction wheel 35. It will be understood that the two parts of the axle 34 are loosely mounted upon a solid shaft or spindle 34$^a$. The inner ends of the axle sections are connected by a compensating or differential gear, the same comprising a centrally disposed worm wheel 36 which is loosely mounted on the spindle 34$^a$, and said worm wheel carrying radially disposed beveled pinions 37 which mesh with beveled pinions 38, the latter being fixed on the inner ends of the axle sections 34.

Mounted for sliding movement upon one of the axle sections is a clutch 39 which is operated by a suitable hand lever (not shown), said clutch being provided with a series of pins 40 which pass through apertures 40$^a$ formed in the adjacent beveled pinion 38 and the ends of said pins are adapted to enter corresponding recesses or notches formed inside of worm wheel 36. This type of differential gearing is substantially the same as that disclosed in Fig. 3 of my patent heretofore referred to. This differential gearing is preferably inclosed in a suitable housing 42.

Fixed to and depending from the rear portion of frame 20 is a casting 43, in which is mounted for rotation upon a vertical axis a gear box 44. The lower end of this gear box 44 is journaled in the upper portion of a fixed gear box 45, the same being a part of the casting 43. The lower portion of this gear box 45 is rigidly fixed to a transverse rail 46, the same being connected to the side rails of frame 20 by braces 47.

A short vertically disposed shaft 48 is journaled in gear box 44, said shaft carrying a beveled pinion 49 within said gear box and a beveled pinion 50 within the gear box 45. Journaled in the gear box 45 is a horizontally disposed shaft 51, the same carrying a beveled pinion 52 which meshes with pinion 50 and the outer end of the shaft 51 is connected by a universal joint 52 to one end of a square or non-circular shaft 53, the latter being telescopically mounted within a tubular shaft 54. The forward end of this shaft is connected by a universal joint 55 to a shaft 56, which latter is journaled in suitable bearings in the differential housing 42 and carried by said shaft is a worm 57 which meshes with worm wheel 36.

Journaled within and bearing in the upper portion of gear box 44 is a horizontally disposed shaft 58, and fixed thereon within said gear box is a beveled pinion 59, the same meshing with pinion 49. The shaft 58 extends rearwardly of the machine and it is made square or non-circular and mounted for telescopic movement in a tubular shaft or sleeve 58$^a$.

Located beneath the rear portions of the side rails 10 of the truck frame are semi-elliptic leaf springs 60 and supported in suitable bearings beneath the central portions of said springs is the rear axle 61, the same being made in two parts and each part carrying at its outer end a traction wheel 62. This rear axle is constructed in two parts, tubular in form, and loosely mounted upon a central shaft or spindle 63.

The inner ends of these rear axle sections are united by a compensating or differential gear which is identical in construction and operation with the differential gearing which connects the sections of the front axle heretofore described, and said rear axle differential gearing includes a clutch 64 operated by a suitable hand lever (not shown), said clutch being for the purpose of locking one of the rear axle sections and its beveled gear wheel to the centrally disposed worm wheel 65. This rear axle differential is inclosed in a suitable housing 66 and journaled in suitable bearings therein is a short shaft 67, the same carrying a worm 68 which engages the teeth of worm wheel 65.

One end of shaft 67 is connected by a universal joint 69 to a square or non-circular shaft 70, the latter being telescopically mounted in a tubular member 71, the latter being connected by a universal joint 72 to a short shaft section 73. The end of tubular member 58$^a$ is connected by a universal joint 74 to a short shaft section 75 which corresponds to and is in alinement with the shaft 73 and interposed between said shafts 73 and 75 is a short shaft section 76. Located on this last mentioned shaft 76 is a differential gearing which forms a driving connection between the shafts 73 and 75, said differential gearing including a gear wheel 77 loosely mounted on shaft 76 and carrying radially disposed beveled pinions 78, the latter meshing with beveled gear wheels 79. These gear wheels 79 are provided with sleeves 80 which inclose the ends of the shaft sections 75, 76 and 73. Loosely mounted on the ends of the shaft sections 75 and 73 are clutches 81 and 82 respectively, the same being operated by suitable hand levers (not shown) and adapted to effect a locking engagement between said shafts 73 and 75 and the ends of sleeves 80.

Loosely mounted on one of the sleeves 80 is a clutch 82$^a$ operated by a suitable hand lever 83 and projecting from this clutch through suitable apertures formed in the adjacent gear wheels 79 and adapted to engage in notches or recesses 84 in the gear wheel 77 are pins 85. This last mentioned clutch is for the purpose of effecting locking engagement between the beveled gear wheels 79 and gear wheel 77. This differential gearing including the clutches 81 and 82 are inclosed in a suitable housing, the same being illustrated by dotted lines in Fig. 2.

Journaled in suitable bearings in this housing is a shaft 86 carrying a pinion 87 which meshes with the teeth of gear wheel 77 and meshing with said pinion 87 is a pinion 88, the latter being fixed on the end of engine shaft 15$^a$.

Fixed on top of the side rails 10 of the frame are small track rails 89 and arranged for sliding movement thereupon are inverted channel-shaped rails 90, the same being fixed to the underside of the load carrying box 91. Fixed to the underside of this box 91 at the sides thereof and beneath the front portion are racks 92, the teeth of which engage pinions 93, the latter being fixed on a transversely disposed shaft 94. This shaft is adapted to be manually rotated and the engagement of the teeth of the pinion 93 with the teeth of the racks 92 will effect a sliding movement of the box 91 lengthwise upon the frame of the truck and which action is necessary when the load contained within the box is dumped.

To prevent the box from being moved too far rearwardly when effecting the dumping operation, outwardly projecting stop brackets 95 are fixed to the sides of said box and when the latter has reached its rearward limit of movement, these brackets engage against pins 96 which are located at the rear corners of the truck frame.

Loosely mounted on shaft 94 is a pinion 97, the same being positioned between a pair of loosely mounted plates 98 which latter carry a pair of rollers 99 spaced apart from said pinion. One side of this pinion is provided with teeth or a clutch face, the same projecting through an opening in the adjacent one of the plates 98. One end of a rack bar 100 is adapted to be detachably secured to a bracket 101, the latter depending from the central portion of box 91 at its forward end and when said rack is thus secured to the box its upper portion is positioned between the plates 98 against the rollers 99 with the teeth of the rack in engagement with the teeth of pinion 97. With the parts so positioned, the forward end of the body may be lifted to dump the load, such action being brought about by a manual rotation of shaft 94.

When not in use, the rack bar 100 is detached from bracket 101 and can be carried at any convenient point on the truck or box.

The plates 98 and parts associated therewith are adapted to be shifted lengthwise upon shaft 94 by a suitable hand lever (not shown) so as to move the clutch face on pinion 97 into and out of engagement with a clutch member 102, which latter is fixed on shaft 94. Hinged to the rear portion of the truck frame are folding legs 103 which are normally swung upward into the position shown by solid lines in Figs. 1 and 2 and when the dumping operation is to be performed, these legs can be swung downward into the position shown by dotted lines in Fig. 1, so as to prevent the front portion of the truck from being elevated due to the rearward shifting of the weight of the load of the truck.

Under normal conditions or when the truck is being driven forward, clutches 39, 64 and 82$^a$ are open or disconnected while clutches 81 and 82 are closed or connected and as a result the rotary motion and power of engine shaft 15$^a$ is transmitted from pinion 88 to pinion 87, from the latter to gear wheel 77, thence through pinions 78 to beveled gear wheels 79, and from the latter to shafts 73 and 75. The power and motion thus delivered to shaft 73 is transmitted through sleeve 71, shafts 70 and 67 and through worm 68 to worm wheel 65 and from the latter through the differential gears to the sections 61 of the rear axle, which latter carry the rear wheels 62.

The power and motion delivered to shaft 75 is transmitted through sleeve 58$^a$, shaft 58, beveled gear wheels 59 and 49, thence to shaft 51 through beveled gear wheels 50 and 52, and from said shaft 51 through shaft 53, sleeve 54, shaft 56 and worm 57 to worm wheel 36. From this worm wheel the motion and power is delivered by pinions 37 and beleved gear wheels 38 to the two sections of front axle 34 which carry the front wheels 35. Thus uniform motion and power is delivered to all four wheels and as both parts of both axles are connected by differentials, either wheel of each pair is free to move independently of the other wheel while the truck is making a turn in either direction.

In the event that the front wheels 35 should encounter soft or slippery ground and tend to spin, the two sections of the front axle carrying said front wheels may be positively locked to each other by shifting clutch 39 so that the pins carried thereby pass through the apertures 40ᵃ and beveled pinion 38 and engage in the corresponding notches or recesses in worm wheel 36. When the locking of the front differential has thus been accomplished, both front axle sections will be positively driven from the engine and by releasing the clutch 82 to cut off the power transmitted to rear axle, and closing clutches 82ᵃ and 81 all of the engine power can be delivered to the front axle and wheels, thereby enabling them to pass over the soft or slippery ground. Likewise, the rear axle sections 61 can be locked to each other by manipulating the clutch 64 and when this has been effected, and clutch 81 disconnected, all the engine power will be delivered to said rear axle and wheels.

To positively drive all four wheels of the truck and the axle sections carrying the same, clutches 39 and 64 and 81 and 82 are closed or locked, and likewise clutch 82ᵃ is closed or locked, thus the power of the engine is positively transmitted to and equally divided between the four wheels.

To steer the truck during its forward movement, the operator manipulates hand wheel 32, thereby rotating shaft 31 and worm 30 and imparts rotary motion to worm wheel 29, shaft 27 and pinion 28, and the latter imparts motion to frame 20 carrying the front axle and wheels by virtue of the engagement of said pinion with the teeth of the arcuate rack 25, and during this movement ring 21 rotates on the bearings 23 beneath ring 18.

While the revolving frame carrying the front axle is being thus turned, gear box 44 will rotate on its vertical axis in casting 43, non-circular shaft 53 will move lengthwise within its sleeve or housing 54, and at the same time non-circular shaft 58 will move lengthwise in its sleeve or housing 58ᵃ.

In the event that it is desired to turn the truck in a circle with the vertical center of one of the rear wheels as the axis of turning movement, the frame carrying the front axle is shifted so that the axis of said front axle is in direct alinement with the center of one of the rear wheels (as illustrated in dotted lines in Fig. 2), after which clutch 82ᵃ is disconnected and clutch 64 is opened, whereupon the power delivered to the rear axle will be transmitted through the differential to the rear wheel opposite to the one serving as the axis for turning movement, and as a result, the truck will be turned in a circle having a diameter practically twice its length.

To dump the load carried by the box 91, shaft 94 is manually rotated by means of crank handles applied to the ends thereof, and as said shaft is rotated, pinions 93 engage the teeth of racks 92, thereby moving the same and the body rearwardly until the brackets 95 engage the stop pins 96. By moving the body rearwardly as just described, the folding legs 103 are swung downward into vertical positions to support the rear end of the truck frame. After the body has been moved rearwardly the rack bar 100 is inserted between the plates 98 in engagement with pinion 97 and the upper end of said rack bar is secured to bracket 101. Prior to this operation the plates 98 are shifted so as to bring the clutch face on pinion 97 into engagement with clutch 102 and shaft 94 is now manually rotated thereby moving rack bar 100 upward, and consequently elevating the forward end of box 91 until the load contained therein discharges from the rear end by gravity. After this dumping operation has been accomplished, the box can be lowered onto the bed, the rack bar 100 disconnected, and said bed moved forward to its normal position by proper manipulation of shaft 94.

It will be understood that the various levers utilized for manipulating all of the clutches associated with the driving connections in my improved truck can be associated with suitable connection rods, cables or the like, and the latter connected to suitable hand levers which are located adjacent to the steering post 31, thereby enabling the driver to readily actuate and control all of said clutches from his position upon the seat 17.

In Fig. 7 I have illustrated a modified form of the bearing between the fixed and movable rings 18 and 21, and in this modified construction said rings are provided with concentric flanges $x$, the same being provided with curved bearing faces which directly engage the balls $z$.

A truck of my improved construction is comparatively simple, can be readily controlled, is capable of being turned completely around within a space practically twice its length and by my improved arrangement of differential gears, all four wheels can be positively driven or, if the necessity arises, all of the engine power can be transmitted to either front or rear wheels.

It will be readily understood that minor changes in the size, form and construction of the various parts of my improved truck can be made and substituted for those herein shown and described without departing from the spirit of my invention, the scope of which is set forth in the appended claims.

I claim:

1. In a motor truck, a truck frame, a rear axle and wheels therefor, a front axle and wheels, a driving shaft arranged between the axles, differential gearing between said driving shaft and the front and rear axles, clutches associated with said differential gearing a differential gearing in the driving shaft, a clutch associated with said last mentioned differential gearing, and clutches located between said last mentioned differential gearing and sections of the driving shaft.

2. In a motor truck, a truck frame, a rear axle and wheels therefor, a front axle and wheels, a driving shaft arranged between the axles, said driving shaft being formed in sections, certain of which sections are telescopically connected to each other and connected by universal joints to other sections, a differential gearing between the forward end of said driving shaft and the front axle, a differential gearing between the rear end of said driving shaft and the rear axle, clutches associated with both front and rear differential gearing, a differential gearing in the driving shaft, a clutch associated with said last mentioned differential gearing, and clutches located between said last mentioned differential gearing and certain sections of the driving shaft.

3. In a motor truck, a main truck frame, a rear axle and wheels therefor, a revolving frame positioned beneath the front portion of the main frame, a front axle and wheels carried by said revolving frame, a driving shaft arranged between the front and rear axles, said driving shaft comprising a front part and a rear part, each part being formed in sections, certain of which sections of each part are telescopically connected to each other and connected by universal joints to other sections, driving connections between the rear end of the front part and the forward end of the rear part, a differential gearing located in the rear part of the driving shaft, a clutch associated with said differential gearing, and clutches located between said differential gearing and adjacent sections of the rear part of the driving shaft.

4. In a motor truck, a main truck frame, a rear axle and wheels therefor, a revolving frame positioned beneath the front portion of the main frame, a front axle and wheels carried by said revolving frame, a driving shaft arranged between the front and rear axles, said driving shaft comprising a front part and a rear part, each part being formed in sections, certain of which sections of each part are telescopically connected to each other and connected by universal joints to other sections, driving connections between the rear end of the front part and the forward end of the rear part, a housing inclosing said driving connections, which housing is carried by the revolving frame, a differential gearing located in the rear part of the driving shaft, a clutch associated with said differential gearing, and clutches located between said differential gearing and adjacent sections of the rear part of the driving shaft.

5. In a motor truck, a truck frame, a rear axle and wheels therefor, a frame arranged for revoluble movement beneath the front end of said truck frame, a front axle and wheels carried by said revoluble frame, a differential gearing associated with said front axle, a clutch associated with said differential gearing, a gear box rigidly fixed beneath the rear portion of the revoluble frame, a second gear box rotatably mounted upon the first-mentioned gear box, pairs of beveled gears arranged within said gear boxes, a driving shaft extending from the lower pair of beveled gears to the differential gearing on the front axle, a portion of said driving shaft being extensible, a driving shaft extending from the upper pair of beveled gears to the rear axle, said last mentioned driving shaft being made in sections, certain of which are extensible, a motor mounted on the main frame of the truck, and driving connections from said motor to the last mentioned driving shaft.

6. In a motor truck, a truck frame, a rear axle and wheels therefor, a frame arranged for revoluble movement beneath the front end of said truck frame, a front axle and wheels carried by said revoluble frame, a differential gearing associated with said front axle, a clutch associated with said differential gearing, a gear box rigidly fixed beneath the rear portion of the revoluble frame, a second gear box rotatably mounted upon the first mentioned gear box, pairs of beveled gears arranged within said gear boxes, a driving shaft extending from the lower pair of beveled gears to the differential gearing on the front axle, a portion of said driving shaft being extensible, a driving shaft extending from the upper pair of beveled gears to the rear axle, said last mentioned driving shaft being made in sections, certain of which are extensible, a differential gearing arranged between certain parts of the last mentioned driving shaft, a clutch associated with said differential gearing, a motor mounted on the main frame of the truck, and driving connections from said motor to said last mentioned differential gearing.

7. In a motor truck, a truck frame, a rear axle and wheels therefor, a frame mounted for revoluble movement beneath the front portion of the main frame, a front axle and wheels carried by said revoluble frame, a differential gearing associated with the rear axle, a differential gearing associated with the front axle, a driving shaft formed in sections and arranged between the differential gearings of the front and rear axles, certain of the sections of said driving shaft being extensible, a differential gearing forming a connection between two of the sections of said driving shaft, a clutch associated with the last mentioned differential gearing, clutches arranged between the sections of the last mentioned differential gearing and adjacent sections of said shaft, a motor mounted on the main frame of the truck, and driving connections from said motor to the last mentioned differential gearing.

In testimony whereof I hereunto affix my signature this 1st day of March 1917.

DANIEL T. TIMBERLAKE.